United States Patent
Resconi et al.

(10) Patent No.: US 7,534,841 B2
(45) Date of Patent: May 19, 2009

(54) 1-BUTENE POLYMER AND PROCESS FOR THE PREPARATION THEREOF

(75) Inventors: Luigi Resconi, Ferrara (IT); Maria Silvia Tonti, Ferrara (IT); Friederike Morhard, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 11/665,821

(22) PCT Filed: Sep. 29, 2005

(86) PCT No.: PCT/EP2005/054916

§ 371 (c)(1),
(2), (4) Date: Apr. 19, 2007

(87) PCT Pub. No.: WO2006/045687

PCT Pub. Date: May 4, 2006

(65) Prior Publication Data

US 2007/0276076 A1    Nov. 29, 2007

Related U.S. Application Data

(60) Provisional application No. 60/622,959, filed on Oct. 27, 2004.

(30) Foreign Application Priority Data

Oct. 21, 2004    (EP)    ................................. 04105206

(51) Int. Cl.
C08F 4/64     (2006.01)
C08F 4/76     (2006.01)
C08F 210/08   (2006.01)

(52) U.S. Cl. ........................ 526/161; 526/172; 526/160; 526/170; 526/941; 526/943; 526/348.6; 528/396

(58) Field of Classification Search ................. 526/348, 526/161, 172, 905, 348.6; 528/396
See application file for complete search history.

(56) References Cited

U.S. PATENT DOCUMENTS

| 4,298,718 A |   | 11/1981 | Mayr et al. |
|---|---|---|---|
| 4,298,722 A |   | 11/1981 | Collette et al. |
| 4,399,054 A |   | 8/1983  | Ferraris et al. |
| 4,469,648 A |   | 9/1984  | Ferraris et al. |
| 4,495,338 A |   | 1/1985  | Mayr et al. |
| 5,463,524 A |   | 10/1995 | Szirmai |
| 5,889,121 A | * | 3/1999  | Hwo et al. ................... 525/240 |
| 6,055,980 A |   | 5/2000  | Mecikalski et al. |
| 6,306,996 B1 |   | 10/2001 | Cecchin et al. |
| 6,340,730 B1 | * | 1/2002  | Murray et al. ............... 526/114 |
| 6,559,252 B1 |   | 5/2003  | Horton et al. |
| 6,585,010 B2 |   | 7/2003  | Takahashi et al. |
| 6,608,224 B2 |   | 8/2003  | Resconi et al. |
| 6,841,501 B2 |   | 1/2005  | Resconi et al. |
| 6,878,786 B2 |   | 4/2005  | Resconi et al. |
| 6,887,955 B2 | * | 5/2005  | Deckers et al. ................. 526/79 |
| 6,930,190 B2 |   | 8/2005  | Nifant'ev et al. |
| 6,949,614 B1 |   | 9/2005  | Schottek et al. |
| 6,953,829 B2 |   | 10/2005 | Kratzer et al. |
| 7,074,864 B2 |   | 7/2006  | Resconi |
| 7,101,940 B2 |   | 9/2006  | Schottek et al. |
| 7,112,638 B2 |   | 9/2006  | Nifant'ev et al. |
| 7,141,527 B1 |   | 11/2006 | Van Baar et al. |
| 7,166,683 B2 |   | 1/2007  | Resconi |
| 2001/0027790 A1 |   | 10/2001 | Gieschen et al. |
| 2004/0132612 A1 |   | 7/2004  | Resconi et al. |
| 2004/0254315 A1 |   | 12/2004 | Resconi |
| 2006/0094840 A1 |   | 5/2006  | Resconi et al. |
| 2006/0235173 A1 |   | 10/2006 | Resconi |

FOREIGN PATENT DOCUMENTS

| DE | 2241412  | 3/1974  |
|---|---|---|
| DE | 19917985 | 10/2000 |
| DE | 19962814 | 6/2001  |
| DE | 19962910 | 7/2001  |
| EP | 172961   | 3/1986  |

(Continued)

OTHER PUBLICATIONS

H. N. Cheng,"$^{13}$C NMR Analysis of Propylene-Butylene Copolymers by a Reaction Probability Model," *Journal of Polymer Science: Polymer Physics Edition*, vol. 21, vol. 573-581 (1983).

(Continued)

*Primary Examiner*—Vasu Jagannathan
*Assistant Examiner*—Rip A. Lee
(74) *Attorney, Agent, or Firm*—William R Reid

(57) ABSTRACT

A 1-butene polymer optionally containing from 0 to 30% by mol of derived units of ethylene, propylene or alpha-olefin of formula $CH_2=CHZ$, wherein Z is a $C_3$-$C_{20}$ linear or branched alkyl radical, having the following features:
  a) distribution of molecular weight (Mw/Mn) lower than 4;
  b) Melt flow rate (MFR) measured according to ISO 1133 (190° C., 2.16 kg);
  c) Intrinsic viscosity (IV) measured in tetrahydronaftalene (THN) at 135° C. lower than 0.8 dl/g;
  d) melting point higher than 100° C.;
  e) isotactic pentads (mmmm) measured with $^{13}$C-NMR operating at 100.61 MHz higher than 90%;
  f) 4,1 insertions not detectable at a $C^{13}$-NMR operating at 100.61 MHz; and
  g) a yellowness index lower than 0.

7 Claims, No Drawings

FOREIGN PATENT DOCUMENTS

| | | |
|---|---|---|
| EP | 186968 | 7/1986 |
| EP | 395083 | 10/1990 |
| EP | 442412 | 8/1991 |
| EP | 553805 | 8/1993 |
| EP | 553806 | 8/1993 |
| EP | 601525 | 6/1994 |
| EP | 775707 | 5/1997 |
| WO | 82/00826 | 3/1982 |
| WO | 91/02012 | 2/1991 |
| WO | 92/00333 | 1/1992 |
| WO | 99/21899 | 5/1999 |
| WO | 99/45043 | 9/1999 |
| WO | 01/21674 | 3/2001 |
| WO | 01/47939 | 7/2001 |
| WO | 01/62764 | 8/2001 |
| WO | 02/14384 | 2/2002 |
| WO | 02/18000 | 3/2002 |
| WO | 02/100908 | 12/2002 |
| WO | 02/100909 | 12/2002 |
| WO | 02/102811 | 12/2002 |
| WO | 03/014107 | 2/2003 |
| WO | 03/042258 | 5/2003 |
| WO | WO 03/042258 A1 * | 5/2003 |
| WO | 2004/005360 | 1/2004 |
| WO | 2004/009269 | 1/2004 |
| WO | 2005/095468 | 10/2005 |
| WO | 2006/042815 | 4/2006 |

OTHER PUBLICATIONS

T. Asakura et al., "Carbon-13 NMR Spectral Assignment of Five Polyolefins Determined from the Chemical Shift Calculations and the Polymerization Mechanism," *Macromolecules*, vol. 24(9), p. 2334-2340 (1991).

R. Chûjô et al., "Two-site model analysis of $^{13}$C n.m.r. of polypropylene polymerized by Ziegler-Natta catalyst with external alkoxysilane donors," *Polymer*, vol. 35(2), p. 339-342 (1994).

V. Busico et al., "Regiospecificity of 1-butene polymerization catalyzed by $C_2$-symmetric group IV metallocenes," *Macromol. Rapid Commun.*, vol. 16, p. 269-274 (1995).

L. Resconi et al., "1-Olefin Polymerization at Bis(pentamethylcyclopentadienyl)zirconium and -hafnium Centers: Enantioface Selectivity," *Macromolecules*, vol. 25(25), p. 6814-6817 (1992).

* cited by examiner

1-BUTENE POLYMER AND PROCESS FOR THE PREPARATION THEREOF

This application is the U.S. national phase of International Application PCT/EP2005/054916, filed Sep. 29, 2005, claiming priority to European Patent Application 04105206.9 filed Oct. 21, 2004, and the benefit under 35 U.S.C. 119(e) of U.S. Provisional Application No. 60/622,959, filed Oct. 27, 2004; the disclosures of International Application PCT/EP2005/054916, European Patent Application 04105206.9 and U.S. Provisional Application No. 60/622,959, each as filed, are incorporated herein by reference.

The present invention relates to a 1-butene polymer having a narrow molecular weight distribution, a very high melt flow rate and a very low content of catalyst residue. 1-butene polymers are well known in the art. In view of their good properties in terms of pressure resistance, creep resistance, and impact strength, they are widely used for example in the manufacture of pipes for metal pipe replacement, easy-open packaging and films.

1-butene (co)polymers can be obtained for example by polymerizing the monomers in the presence of a stereospecific catalyst comprising: (A) a solid component comprising a Ti compound and an electron-donor compound supported on $MgCl_2$; (B) an alkylaluminum compound and, optionally, (C) an external electron-donor compound. A process of this type is disclosed in EP-A-172961 and WO99/45043.

1-butene polymers have been also obtained by using metallocene-based catalyst system. Polymers of this kind are disclosed for example in WO 02/100908, WO 02/100909 and WO 03/014107 or in EP03101304.8. The 1-butene polymers obtained by using metallocene catalysts are generally endowed with a narrow molecular weight distribution, quite high isotacticity and high molecular weight.

For certain application such as fluidiser for lubricants, there is however the need of a 1-butene polymer having a very high melt flow rate (MFR) moreover especially for the application in the field of lubricants this polymer should have also a very low content of ash so that to lower the abrasion phenomena. Furthermore, the fact that the polymer is endowed with a narrow molecular weight distribution gives rise to the effect that there are not oligomers dispersed in the polymer and therefore the polymer is homogeneous and when used, for example, in the application reported above there are not side effects due to the presence of these oligomers fractions.

A process for obtaining high MFR 1-butene polymer known in the art is based on the thermodegradation (visbreaking) of crystalline polymers. Said thermodegradation process is carried out maintaining the polymers in the molten state in the presence of radical generators, such as organic peroxides. Thus the polymer chains are degraded in segments whose length can be controlled by choosing the proper conditions for the thermodegradation process. However, the above process has the disadvantage of altering considerably the physical and chemical structure of the initial polymers. In fact, the high MFR polymers obtained with said process present particularly low Mw and Mz molecular weight average values consequently there is a considerable decline of the physicomechanical properties related to the molecular weights, such as flexural modulus and tensile properties. Moreover, due to the high temperatures used and the presence of radicals, the above process causes secondary reactions that can bring to the formation of branched polymer chains containing double bonds. Furthermore this process gives rise to a considerably high yellowness index. Therefore, the polymers obtained by way of thermodegradation possess characteristics that can be disadvantageous, such as, for example, reduced resistance to heat and oxidation. Finally, the presence of the decomposition products of the free radical generators in the thermodegraded polymer may present additional disadvantages, in particular odour and food incompatibility problems, as revealed in EP 442 412. Thus an object of the present invention is a 1-butene polymer endowed with a high melt flow rate (MFR), a high melting point, high level of isotacticity, absence of regioerrors and a very low yellowness index in order to obtain a material having new and improved features.

The present invention relates to a 1-butene polymer optionally containing from 0 to 30% by mol of derived units of ethylene, propylene or alpha-olefin of formula $CH_2\!=\!CHZ$, wherein Z is a $C_3$-$C_{20}$ linear or branched alkyl radical, having the following features:

a) distribution of molecular weight (Mw/Mn) lower than 4; preferably lower than 3; more preferably lower than 2.5;

b) Melt flow rate (MFR) measured according to ISO 1133 (190° C., 2.16 kg) ranging from 200 to 1000; preferably the melt flow rate is comprised between 300 and 900; more preferably it is comprised between 400 and 900;

c) Intrinsic viscosity (IV) measured in tetrahydronaphthalene (THN) at 135° C. lower than 0.8 dl/g; preferably the intrinsic viscosity is comprised between 0.2 dl/g and 0.6 dl/g; even more preferably IV is comprised between 0.3 dl/g and 0.6 dl/g; e further preferred range is between 0.3 dl/g and 0.5 dl/g;

d) melting point higher than 90° C.; preferably higher than 100° C.; more preferably higher than 102° C.

e) isotactic pentads (mmmm) measured with $^{13}$C-NMR operating at 100.61 MHz higher than 90%; preferably higher than 95%;

f) 4,1 insertions not detectable at a $C^{13}$-NMR operating at 100.61 MHz; and g) yellowness index lower than 0; preferably comprised between 0 and −10; more preferably comprised between −1 and −5; even more preferably comprised between −2 and −4.

Preferably the 1-butene polymers object of the present invention are a 1-butene homopolymer or a 1-butene/ethylene copolymer or a 1-butene/propylene copolymer. In the 1-butene polymer object of the present invention the aluminum content that constitutes the bigger part of the catalyst residues ranges from 2 ppm by weight to 40 ppm by weight; preferably the aluminum content ranges from 2 ppm by weight to 30 ppm by weight; more preferably from 3 ppm by weight to 20 ppm by weight.

The 1-butene polymer object of the present invention can be obtained with a process that uses a particular class of metallocene-based catalyst systems. Therefore a further object of the present invention is a process for preparing 1-butene polymers having the features described above, said process comprising polymerizing 1-butene or copolymerizing 1-butene with ethylene, propylene or an alpha-olefin of formula $CH_2\!=\!CHZ$ wherein Z is a $C_3$-$C_{10}$ alkyl group, in the presence of a hydrogen concentration in the reactor higher than 1000 mol ppm and in the presence of a catalyst system obtainable by contacting:

(A) a metallocene compound belonging to the following formula (I):

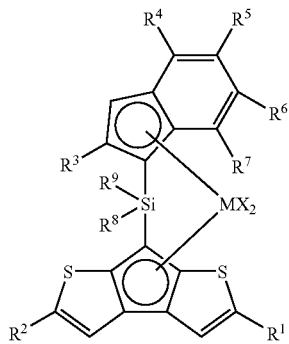

wherein:
M is an atom of a transition metal selected from those belonging to group 3, 4, or to the lanthanide or actinide groups in the Periodic Table of the Elements; preferably M is zirconium;

X, equal to or different from each other, is a hydrogen atom, a halogen atom, a R, OR, OR'O, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom, a OR'O or R group; more preferably X is chlorine or a methyl radical;

$R^1$, $R^2$, $R^5$, $R^6$, $R^7$, $R^8$ and $R^9$, equal to or different from each other, are hydrogen atoms, or $C_1$-$C_{40}$ hydrocarbon radicals optionally containing heteroatoms belonging to groups 13-17 of the Periodic Table of the Elements; preferably $R^1$, $R^2$, $R^5$, $R^6$, $R^7$, $R^8$ and $R^9$, equal to or different from each other, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals, optionally containing heteroatoms belonging to groups 13-17 of the Periodic Table of the Elements; or $R^5$ and $R^6$, and/or $R^8$ and $R^9$ can optionally form a saturated or unsaturated, 5 or 6 membered rings, said ring can bear $C_1$-$C_{20}$ alkyl radicals as substituents; with the proviso that at least one of $R^6$ or $R^7$ is a linear or branched, cyclic or acyclic, $C_1$-$C_{40}$-alkyl, $C_2$-$C_{40}$ alkenyl, $C_2$-$C_{40}$ alkynyl radical, optionally containing heteroatoms belonging to groups 13-17 of the Periodic Table of the Elements; preferably a $C_1$-$C_{10}$-alkyl radical;

preferably $R^1$, $R^2$, are the same and are $C_1$-$C_{10}$ alkyl radicals optionally containing one or more silicon atoms; more preferably $R^1$ and $R^2$ are methyl radicals;

$R^8$ and $R^9$, equal to or different from each other, are preferably $C_1$-$C_{10}$ alkyl or $C_6$-$C_{20}$ aryl radicals; more preferably they are methyl radicals;

$R^5$ is preferably a hydrogen atom or a methyl radical;

$R^6$ is preferably a hydrogen atom or a methyl, ethyl or isopropyl radical;

$R^7$ is preferably a linear or branched, cyclic or acyclic, $C_1$-$C_{40}$-alkyl, $C_2$-$C_{40}$ alkenyl, $C_2$-$C_{40}$ alkynyl radical, optionally containing heteroatoms belonging to groups 13-17 of the Periodic Table of the Elements; preferably a $C_1$-$C_{10}$-alkyl radical; more preferably $R^7$ is a methyl or ethyl radical; otherwise when $R^6$ is different from a hydrogen atom, $R^7$ is preferably a hydrogen atom;

$R^3$ and $R^4$, equal to or different from each other, are linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements; preferably $R^3$ and $R^4$ equal to or different from each other are $C_1$-$C_{10}$-alkyl radicals; more preferably $R^3$ is a methyl, or ethyl radical; and $R^4$ is a methyl, ethyl or isopropyl radical;

(B) an alumoxane or a compound capable of forming an alkyl metallocene cation; and optionally (C) an organo aluminum compound;

Metallocene compounds of formula (I) have been described, for example, in WO 01/47939 or in EP 04101020.8.

Preferably the compounds of formula (I) have formula (Ia) or (Ib):

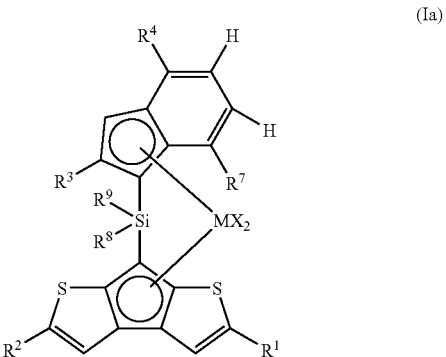

(Ia)

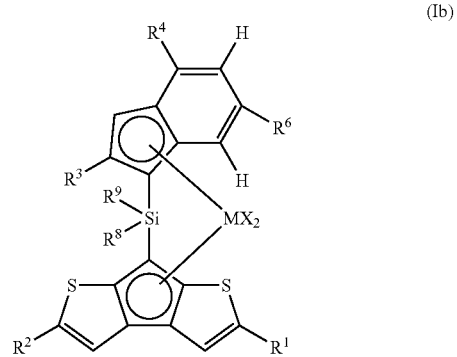

(Ib)

Wherein
M, X, $R^1$, $R^2$, $R^8$ and $R^9$ have been described above;
$R^3$ and $R^4$, equal to or different from each other, are linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements; preferably $R^3$ and $R^4$ equal to or different from each other are $C_1$-$C_{10}$-alkyl radicals; more preferably $R^3$ is a methyl, or ethyl radical; and $R^4$ is a methyl, ethyl or isopropyl radical; $R^6$ and $R^7$ $R^3$ and $R^4$, equal to or different from each other, are linear or branched, cyclic or acyclic, $C_1$-$C_{40}$-alkyl, $C_2$-$C_{40}$ alkenyl, $C_2$-$C_{40}$ alkynyl radicals optionally containing heteroatoms belonging to groups 13-17 of the Periodic Table of the Elements; preferably $C_1$-$C_{10}$-alkyl radicals; more preferably $R^7$ is a methyl or ethyl radical; and $R^6$ is a methyl, ethyl or isopropyl radical.

Alumoxanes used as component B) can be obtained by reacting water with an organo-aluminium compound of formula $H_jAlU_{3-j}$ or $H_jAl_2U_{6-j}$, where U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radical, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene generally is comprised between about 10:1 and about 20000:1, and more preferably between about 100:1 and about 5000:1. The alumoxanes used in the catalyst according to the invention are considered to be linear, branched or cyclic compounds containing at least one group of the type:

wherein the substituents U, same or different, are described above.

In particular, alumoxanes of the formula:

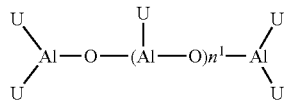

can be used in the case of linear compounds, wherein $n^1$ is 0 or an integer from 1 to 40 and the substituents U are defined as above, or alumoxanes of the formula:

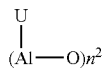

can be used in the case of cyclic compounds, wherein $n^2$ is an integer from 2 to 40 and the U substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in WO01/21674 in which the alkyl and aryl groups have specific branched patterns. Non-limiting examples of aluminium compounds according to WO 99/21899 and WO01/21674 are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl) aluminium, tris(2-ethyl-3,3-dimethyl-butyl)aluminium, tris (2-ethyl-3,3-dimethyl-pentyl)aluminium, tris(2-isopropyl-3, 3-dimethyl-butyl)aluminium, tris(2-trimethylsilyl-propyl) aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl) aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis (trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAr_3P$ wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1. Non limiting examples of compounds of formula $D^+E^-$ are:
Tributylammoniumtetra(pentafluorophenyl)borate,
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylaniliniumtetrakis(pentafluorophenyl)boratee,
N,N-Dimethylaniliniumtetrakis(pentafluorophenyl)aluminate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate,
N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764. Organic aluminum compounds used as compound C) are those of formula $H_jAlU_{3-j}$ or $H_jAl_2U_{6-j}$ described above.

The polymerization process of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane, isododecane). Preferably, the polymerization process of the present invention is carried out by using liquid 1-butene as polymerization medium. The polymerization temperature preferably ranges from 20° C. to 150° C. and, more particularly between 50° C. and 90° C. The 1-butene polymer object of the present invention is endowed with a very low content of aluminum that is the bigger part of the catalyst residue. This is due to the fact that the activity of the metallocene compound of formula (I) in the presence of high amount of hydrogen is strongly increased, therefore hydrogen can be advantageously used both as molecular weight regulator and as activator of the catalyst system. This synergistic effect allows to obtain the 1-buten polymer object of the present invention in very high yield, and consequently lowering the content of catalyst residue.

This advantage renders the polymer object of the present invention fit for food packaging and medical uses.

The concentration of hydrogen during the polymerization reaction is higher than 1000 ppm by mole; preferably it is higher than 2000 ppm by mole and lower than 10000 ppm by mole; more preferably it is comprised between 3000 ppm by mole and 8000 ppm by mole.

EXAMPLES

Experimental Section

The intrinsic viscosity (I.V.) was measured in tetrahydronaphtalene (THN) at 135° C. The melting points of the polymers ($T_m$) were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$). Molecular weight parameters and molecular weight distribution for all the samples were measured using a Waters 150 C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times10^{-4}$, dL/g and $K_{PB}=1.78\times10^{-4}$ dL/g for polystyrene and poly-1-butene respectively. The Mark-Houwink exponents α were assumed to be 0.706 for polystyrene and 0.725 for poly-1-butene. Even though, in this approach, the molecular parameters obtained were only an estimate of the hydrodynamic volume of each chain, they allowed a relative comparison to be made.

NMR analysis. $^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz 16) to remove $^1$H-$^{13}$C coupling. About 3000 transients were stored in 32K data points using a spectral window of 6000 Hz. The isotacticity of metallocene-made PB is measured by $^{13}$C NMR, and is defined as the relative intensity of the mmmm pentad peak of the diagnostic methylene of the ethyl branch. This peak at 27.73 ppm was used as internal reference. Pentad assignments are given according to *Macromolecules*, 1992, 25, 6814-6817.

The side chain methylene region of PB spectrum was fitted using the routine for deconvolution included in the Bruker WIN-NMR program. The mmmm pentad and the pentads related to the single unit error (mmmr, mmrr and mrrm) were fitted using Lorenzian lineshapes, allowing the program to change the intensity and the width of the lines. As a result the relative intensities of those signals were obtained. These results were used for the statistical modelling of pentad distributions using an enantiomorphic site model, in order to obtain the complete pentad distribution, from which the triad distribution is derived.

Assignments of 4,1 insertion were made according to V. Busico, R. Cipullo, A. Borriello, *Macromol. Rapid. Commun.* 1995, 16, 269-274.

Melt flow rate was measured according to ISO 1133 (190° C., 2.16 kg)

Flexural modulus, strength at yield, elongation at break, strength at break and elongation at yield have been measured according to ISO 527-1.

Samples were prepared and treated as follows:

Specimens for tensile and flexural modulus test are cut from compression moulding plaques pressed at 200° C. and ageed via autoclave at RT for 10' at 2 kbar. Specimen thickness 4 mm for flexural modulus, 2 mm for tensile test.

Yellowness index was measured accordingly to ASTM D1925.

The content of aluminum in the polymer was measured by using an atomic adsorption instrument. The results are expressed as ppm by weight.

Preparation of Catalyst Components

Rac dimethylsilyl{(2,4,7-trimethyl-1-indenyl)-7-(2,5-dimethyl-cyclopenta[1,2-b:4,3-b']-dithiophene)} zirconium dimethyl (A-1); was prepared according to EP 04101020.8.

Preparation of the Catalytic Solution

Under nitrogen atmosphere, 2390 g of a 110 g/L solution of TIBA in isododecane and 664 g of 30% wt/wt solution of MAO in toluene are loaded in a 20 L jacketed glass reactor, stirred by means of an anchor stirrer, and allowed to react at 50-55° C. for about 1 hour under stirring.

After this time, 7.09 g of metallocene A-1 is added and dissolved under stirring for about 30 minutes. The so obtained solution was diluted with 1200 g of anhydrous iso-dodecane.

The final solution is discharged from the reactor into a cylinder through a filter to remove eventual solid residues.

The composition of the solution resulted to be:

| % w Al | % w Zr | Al/Zr mol ratio | % w toluene | Conc. g/L |
|---|---|---|---|---|
| 25.32 | 0.22 | 429 | 10 | 107 |

Polymerization Examples, General Procedure

The polymerization was carried out in a pilot plant comprising two stirred reactors connected in series in which liquid butene-1 constituted the liquid medium. The catalyst system described above was injected into the reactor at a feed rate of 4 g/h and the polymerization was carried out in continuous at a polymerization temperature of 70° C. The residence time was 160 min. The trial was started by feeding 500 mol ppm of hydrogen, in order to produce a first sample of polymer with MFR around 10-15 g/10 min. Then hydrogen was stepwise increased up to a concentration of 3800 mol ppm and homopolymer grade with MFR around 570 g/10 min was steadily produced (Example 1) Then the hydrogen concentration in the reactor was increased up to 5500 mol ppm and as a consequence the MFR went up to 770 g/10 min. The homo PB grade produced under this stable conditions was sampled and analyzed (example 2). The catalyst yield with a concentration of 5500 ppm by mole was 105 kg/kg referred to A-1

The 1-butene polymer was recovered as melt from the solution and cut in pellets. The characterization data of the obtained polymers are reported in Table 1.

TABLE 1

| Ex | MFR g/10 min | yellowness index | Mw/Mn | Tm(II) ° C. | I.V. dl/g |
|---|---|---|---|---|---|
| 1 | 570 | −2.3 | 2.4 | 103 | 0.48 |
| 2 | 770 | −2.5 | 2.3 | 103 | 0.44 |

| Ex | mmmm % | 4,1 insertions | Aluminum (ppm by weight) |
|---|---|---|---|
| 1 | >96 | n.d. | 18 |
| 2 | >96 | n.d. | 18 | n.d. not detectable

The polymers obtained in examples 1 and 2 were further characterized, the results are reported in table 2

TABLE 2

| | | Ex | |
|---|---|---|---|
| | | 1 | 2 |
| Flexural Modulus | MPa | 391 | 415 |
| Strength @ Yield | N/mm² | 22 | 21.8 |
| Elongation @ Yield | % | 20.1 | 16.7 |
| Strength @ Break | N/mm² | 18.2 | 20.6 |
| Elongation @ Break | % | 209 | 26 |
| yellowness index | | −2.3 | −2.5 |

The invention claimed is:

1. A process for preparing 1-butene polymers comprising the properties:
   a) a distribution of molecular weight (Mw/Mn) lower than 3;
   b) a melt flow rate (MFR) measured according to ISO 1133 (190° C., 2.16 kg) ranging from 200 to 1000;
   c) an intrinsic viscosity (IV) measured in tetrahydronaphthalene (THN) at 135° C. lower than 0.8 dl/g;
   d) a melting point higher than 90° C.;
   e) isotactic pentads (mmmm) measured with $^{13}$C-NMR operating at 100.61 MHz higher than 90% corresponding to the total units derived from butene and copolymerized alpha olefins;
   f) 4,1 insertions not detectable at a $C^{13}$-NMR operating at 100.61 MHz;
   g) a yellowness index lower than 0; and
   h) an aluminum content ranging from 2 ppm by weight to 40 ppm by weight,
   the process comprising polymerizing 1-butene or copolymerizing 1-butene with ethylene, propylene or an alpha-olefin of formula $CH_2=CHZ$ wherein Z is a $C_3$-$C_{10}$ alkyl group, in the presence of hydrogen at a concentration higher than 1000 ppm by mole and a catalyst system obtained by contacting:
   (A) a metallocene compound represented by formula (I):

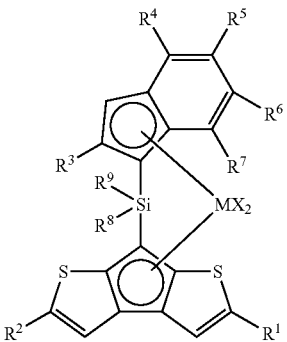

(I)

wherein:

M is an atom of a transition metal selected from those belonging to group 3, 4, or to the lanthanide or actinide groups in the Periodic Table of the Elements;

X, equal to or different from each other, is a hydrogen atom, a halogen atom, a R, OR, OR'O, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical;

$R^1$, $R^2$, $R^5$, $R^6$, $R^7$, $R^8$ and $R^9$, equal to or different from each other, are hydrogen atoms, or $C_1$-$C_{40}$ hydrocarbon radicals optionally containing heteroatoms belonging to groups 13-17 of the Periodic Table of the Elements; or $R^5$ and $R^6$, and/or $R^8$ and $R^9$ can optionally form a saturated or unsaturated, 5 or 6 membered rings, said ring can bear $C_1$-$C_{20}$ alkyl radicals as substituents; with the proviso that at least one of $R^6$ or $R^7$ is a linear or branched, cyclic or acyclic, $C_1$-$C_{40}$-alkyl, $C_2$-$C_{40}$ alkenyl, $C_2$-$C_{40}$ alkynyl radical, optionally containing heteroatoms belonging to groups 13-17 of the Periodic Table of the Elements;

$R^3$ and $R^4$, equal to or different from each other, are linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements;

(B) an alumoxane or a compound that forms an alkyl metallocene cation; and optionally (C) an organo aluminum compound.

2. The process according to claim 1 wherein in the compound of formula (I):
- $R^1$, $R^2$, are the same and are $C_1$-$C_{10}$ alkyl radicals optionally containing at least one silicon atom;
- $R^8$ and $R^9$, equal to or different from each other, are $C_1$-$C_{10}$ alkyl or $C_6$-$C_{20}$ aryl radicals;
- $R^5$ is a hydrogen atom or a methyl radical;
- $R^6$ is a hydrogen atom or a methyl, ethyl or isopropyl radical;
- $R^7$ is a linear or branched, cyclic or acyclic, $C_1$-$C_{40}$-alkyl, $C_2$-$C_{40}$ alkenyl, $C_2$-$C_{40}$ alkynyl radical, optionally containing heteroatoms belonging to groups 13-17 of the Periodic Table of the Elements; otherwise when $R^6$ is different from a hydrogen atom, $R^7$ is a hydrogen atom; and
- $R^3$ and $R^4$ equal to or different from each other are $C_1$-$C_{10}$-alkyl radicals.

3. The process according to claim 2 wherein the metallocene compound has formula (Ia) or (Ib):

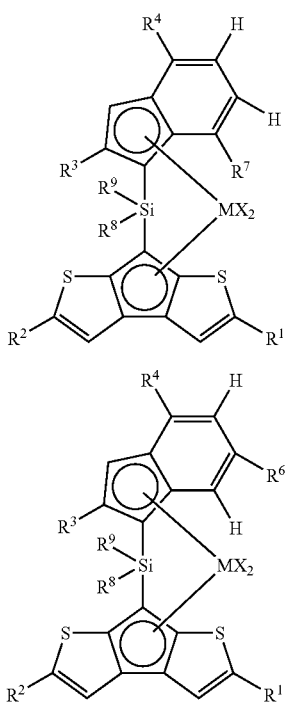

wherein
$R^3$ and $R^4$, equal to or different from each other, are linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements; $R^6$ and $R^7$, equal to or different from each other, are linear or branched, cyclic or acyclic, $C_1$-$C_{40}$-alkyl, $C_2$-$C_{40}$ alkenyl, $C_2$-$C_{40}$ alkynyl radicals, optionally containing heteroatoms belonging to groups 13-17 of the Periodic Table of the Elements.

4. The process according to claim 2 wherein the concentration of hydrogen is higher than 2000 ppm by mole and lower than 10000 ppm by mole.

5. A 1-butene polymer optionally containing from 0 to 30% by mol of derived units of ethylene, propylene or alpha-olefin of formula $CH_2=CHZ$, wherein Z is a $C_3$-$C_{20}$ linear or branched alkyl radical, comprising the properties:
- a) a distribution of molecular weight (Mw/Mn) lower than 3;
- b) a melt flow rate (MFR) measured according to ISO 1133 (190° C., 2.16 kg) ranging from 200 to 1000;
- c) an intrinsic viscosity (IV) measured in tetrahydronaphthalene (THN) at 135° C. lower than 0.8 dl/g;
- d) a melting point higher than 90° C.;
- e) isotactic pentads (mmmm) measured with $^{13}$C-NMR operating at 100.61 MHz higher than 90% corresponding to the total units derived from butene and copolymerized alpha olefins;
- f) 4,1 insertions not detectable at a $C^{13}$-NMR operating at 100.61 MHz;
- g) a yellowness index lower than 0; and
- h) an aluminum content ranging from 2 to 40 ppm by weight.

6. The 1-butene polymer according to claim 5 wherein the melt flow rate ranges from 300 and 900; the intrinsic viscosity (IV) ranges from 0.2 dl/g to 0.6 dl/g; and the yellowness index ranges from 0 to −10.

7. The 1-butene polymer according to claim 5 being a 1-butene homopolymer, a 1-butene/ethylene copolymer or a 1-butene/propylene copolymer.

* * * * *